C. COLE & F. L. FRENCH.
Pruning Implement.

No. 222,244.    Patented Dec. 2, 1879.

Witnesses:
Donn P. Twitchell.
Samuel W. Cole.

Inventor:
Converse Cole
Frank L. French

UNITED STATES PATENT OFFICE.

CONVERSE COLE AND FRANK L. FRENCH, OF MERIDEN, NEW HAMPSHIRE.

IMPROVEMENT IN PRUNING IMPLEMENTS.

Specification forming part of Letters Patent No. 222,244, dated December 2, 1879; application filed September 3, 1879.

*To all whom it may concern:*

Be it known that we, CONVERSE COLE and FRANK L. FRENCH, of Meriden, in the county of Sullivan and State of New Hampshire, have invented a new and useful Improvement in Pruning Implements, of which the following is a specification.

The invention relates to that class of pruning devices that are operated by pulling the main handle, and in which means are provided for automatically separating the cutting-blades after the completion of their work.

It consists in certain new constructions and arrangement of parts, whereby the implement is simplified, and greater efficiency is secured, as will appear from the following description, the novel arrangement of parts being specifically mentioned in the claims.

Figure 1:
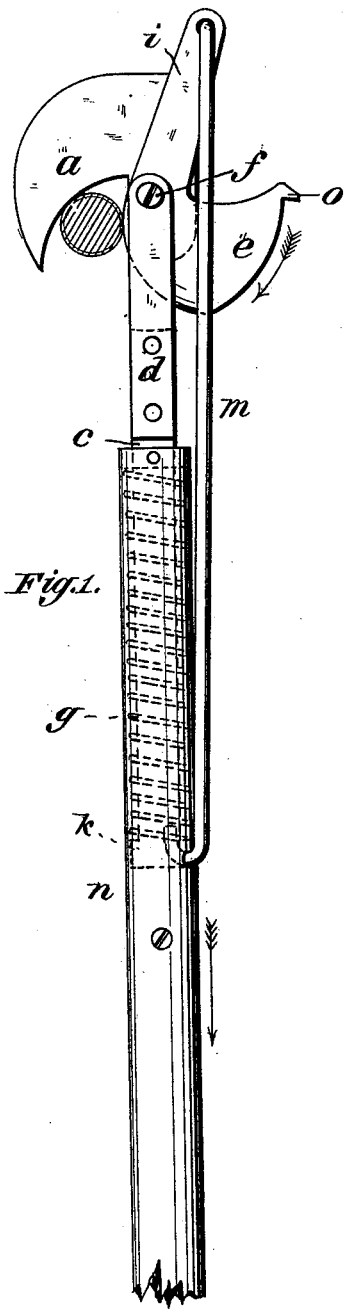
Figure 2:
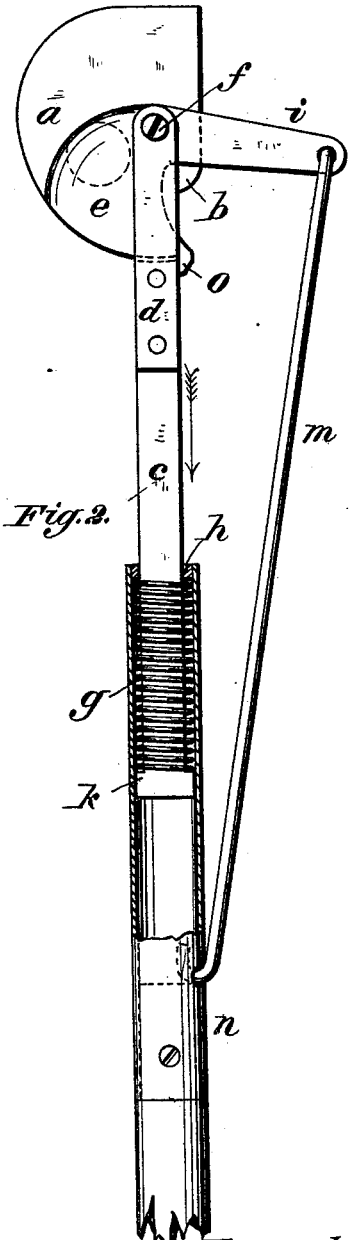

In the accompanying drawings, Figure 1 represents a side view of our improved pruning implement, and Fig. 2 shows the same at the completion of the cutting movement, part of the handle being broken away to show the compressed spring.

$a$ indicates the upper concave or hooked blade; $b$, its shank or tang; $c$, an extension thereof, and $d$ a side piece riveted at its lower end to the shank and its extension-piece, a space being left between the side piece and the shank at their upper ends, in which the blade $e$, pivoted at $f$, moves.

The extended shank of the upper blade slides freely in a slot or opening formed in the handle. A spring, $g$, bears against a shoulder, $h$, in the upper end of the handle, and also against an enlargement, $k$, at the end of the extension-piece, as shown.

The lower blade, $e$, has a shank, $i$, loosely connected by rod $m$ to the handle $n$.

The upper end of the handle preferably consists of a metallic ferrule or tubular portion. It is made hollow, to receive the spring and shank, as shown.

In operation, the hook-blade $a$ is passed over the limb or stalk to be cut, and is drawn against it, the extended shank being at the same time partially withdrawn from the handle and the spring compressed.

The shank $i$ of the pivoted blade $e$ being held by the connecting-rod, said blade is in an obvious manner turned on its pivot $f$, and its edge brought in close proximity with the edge of blade $a$. This movement is limited by the projection $o$ coming in contact with the part $c$.

In the reverse movement of the blades the downward movement of the shank-piece $c$ is limited by the contact of the shank $b$ and side piece, $d$, with the end of the handle.

The concave and convex blades are ground on opposite sides, and their edges are formed on similar curves, and the lower or convex blade is pivoted within or below the curvature of the upper blade, in such relation thereto that at the close of the cutting movement the edges are in close proximity throughout their whole extent, without any overlapping, as heretofore customary in this class of implements.

It is obvious that if the pivot were located in, or nearly in, the line of the curvature of the upper blade it would be necessary to provide for the overlapping of the blades to secure any efficient action. We place the pivot below or within the curvature, so that in operation the heels and the points of the blades shall reach contiguity at the same instant.

Actual contact of the blades, however, is prevented by a stop or projection formed on the shank of the pivoted blade, which strikes against the shank-extension of the other blade.

By this construction greater approximate parallelism of the cutting-edges is secured, and the tendency of the blades to slip on the limb or to thrust it forward as they close toward their points is diminished, and the danger of distortion of the parts by the lodgment of a limb laterally between the blades is obviated.

We are aware that a spring adapted to retract a pivoted blade has heretofore been concealed in a recess in the handle, and also that pruning-knives have been operated simply by drawing upon the handle, and we make no claim of novelty in these particulars; but

What we claim, and desire to secure by Letters Patent, is—

1. The combination of the blade e, provided with projection o, and pivoted, substantially as set forth, with the blade a and its shank-extension, and means for operating the blades, substantially as and for the purpose specified.

2. The combination of the blades a and e, the latter being provided with a projection, o, the tangs or shanks of the blades, the connecting-rod, and the handle having a ferrule inclosing the spring, substantially as and for the purpose set forth.

CONVERSE COLE.
FRANK L. FRENCH.

Witnesses:
NOAH L. JEWELL,
SAMUEL W. COLE.